US008209730B2

(12) United States Patent
Hardacker et al.

(10) Patent No.: US 8,209,730 B2
(45) Date of Patent: Jun. 26, 2012

(54) SPECULATIVE VIDEO ON DEMAND

(75) Inventors: Robert L. Hardacker, Escondido, CA (US); Keith Resch, San Diego, CA (US); Robert Allan Unger, El Calon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 309 days.

(21) Appl. No.: 12/456,754

(22) Filed: Jun. 22, 2009

(65) Prior Publication Data

US 2010/0325656 A1 Dec. 23, 2010

(51) Int. Cl.
*H04N 7/173* (2011.01)
(52) U.S. Cl. ........... 725/90; 725/87; 725/88; 725/89; 725/91; 725/93; 725/94; 725/95; 725/96; 725/97; 725/98; 725/100; 725/101; 725/102; 725/103; 386/205; 386/206; 386/343; 386/344; 386/345; 386/346; 386/347; 386/348; 386/349; 386/350; 386/351; 386/352
(58) Field of Classification Search ........... 725/87, 725/89–91, 93–98, 100–103; 386/205–206, 386/343–352
See application file for complete search history.

(56) References Cited

U.S. PATENT DOCUMENTS

| | | | | |
|---|---|---|---|---|
| 5,530,754 A | * | 6/1996 | Garfinkle | 725/8 |
| 5,790,935 A | * | 8/1998 | Payton | 725/91 |
| 5,990,881 A | * | 11/1999 | Inoue et al. | 715/720 |
| 6,018,359 A | * | 1/2000 | Kermode et al. | 725/101 |
| 6,701,528 B1 | * | 3/2004 | Arsenault et al. | 725/89 |
| 7,693,220 B2 | * | 4/2010 | Wang et al. | 375/240.2 |
| 2004/0016000 A1 | | 1/2004 | Zhang et al. | |
| 2005/0195899 A1 | | 9/2005 | Han | |
| 2005/0257239 A1 | * | 11/2005 | Evans et al. | 725/88 |
| 2009/0083279 A1 | | 3/2009 | Hasek | |

FOREIGN PATENT DOCUMENTS

KR  10-2009-0039232  4/2009

(Continued)

OTHER PUBLICATIONS

International Search Report and Written Opinion, PCT/US2010/037272 (filed Jun. 3, 2010), Dec. 10, 2010 (received Dec. 30, 2010).

(Continued)

*Primary Examiner* — Jason Salce
(74) *Attorney, Agent, or Firm* — Miller Patent Services; Jerry A. Miller

(57) ABSTRACT

A method of transmitting a Video-on-Demand (VOD) program involves at a service provider head-end, separating VOD program data into first and second parts; transmitting the first part over a communication network to a recipient receiver for storage at a storage device as cached speculative data, where the transmitting is carried out as a data push when the communication network has available bandwidth to permit such transmitting and without regard for any order having been received for the VOD program to be sent to the receiver; receiving an order for the VOD program to be sent to the receiver; and streaming the second part to the receiver for reassembly into the VOD program at the receiver by combining the second part as it is streamed with the cached speculative data. This abstract is not to be considered limiting, since other embodiments may deviate from the features described in this abstract.

28 Claims, 6 Drawing Sheets

FOREIGN PATENT DOCUMENTS

WO    WO 2009/073827      6/2009

OTHER PUBLICATIONS

"BBC trials 'Push-VoD' Technology," Press Release, BBC, Nov. 12, 2006.

"The Pull of Push VoD," 3Vision, date unknown.

"Technical Report, Video Streaming across Best-Effort Wide-Area Networks with Controlled Quality Assurance Using Proxy Servers," Zhi-li Zhang and Yingfei Dong, Dec. 5, 2000.

"A Practical Technique to Support *Controlled Quality Assurance* in Video Streaming across the Internet," Yingfei Dong et al., Date unknown.

\* cited by examiner

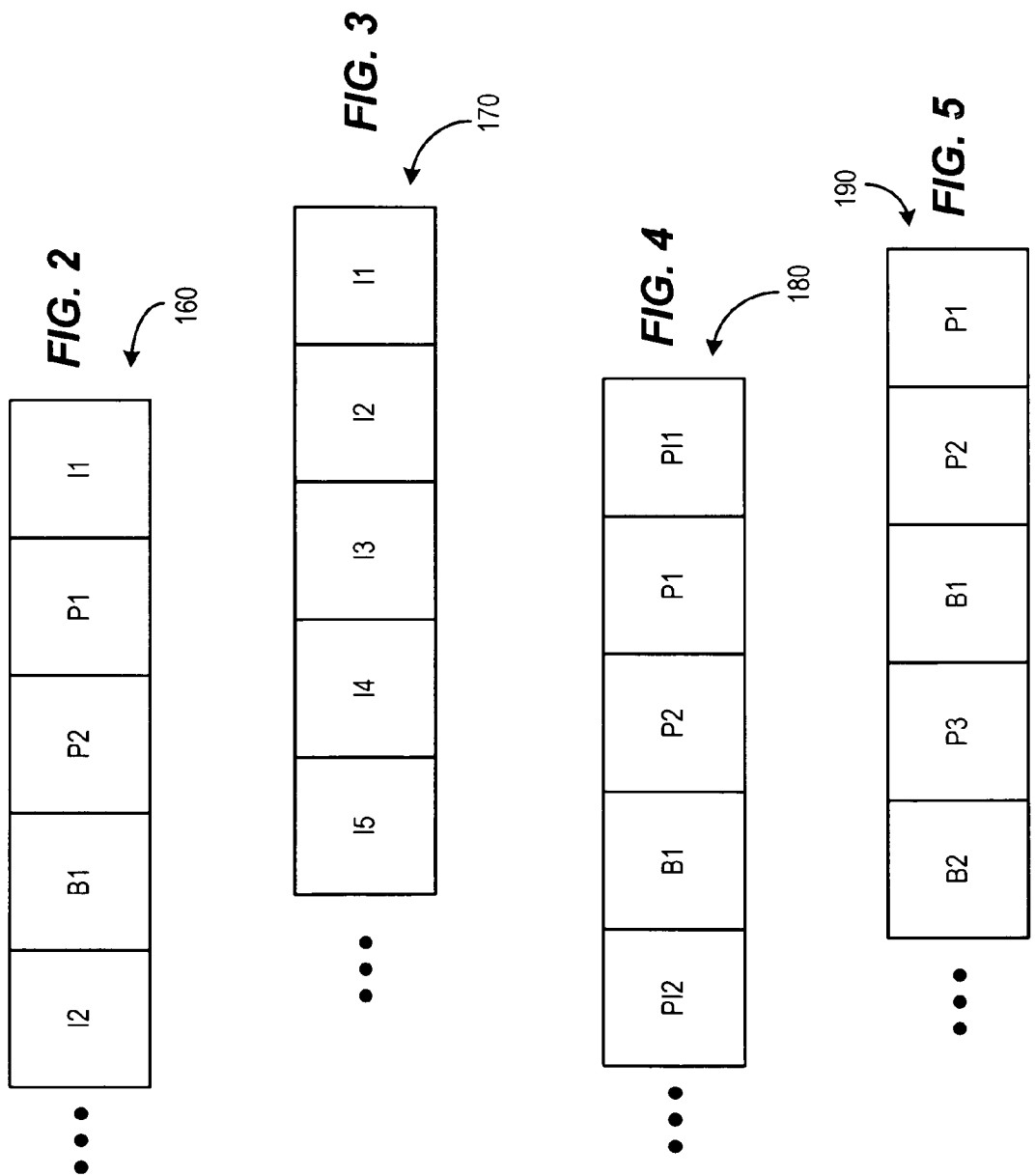

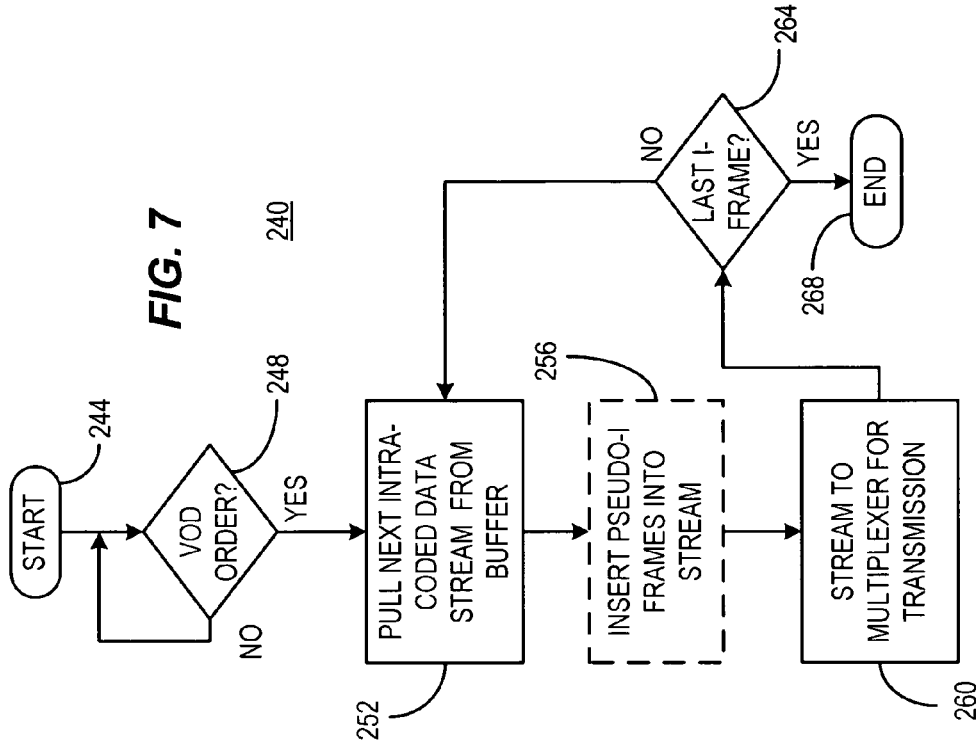
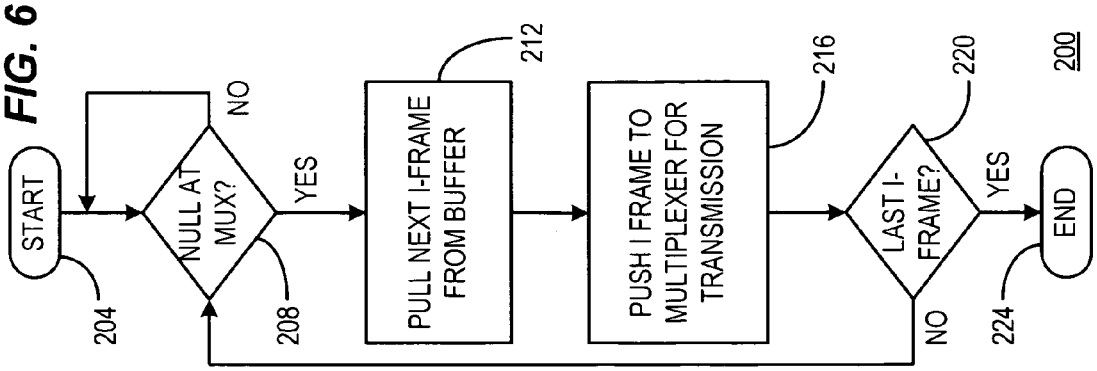

SPECULATIVE VIDEO ON DEMAND

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

In the conventional sense, Video-on-Demand (VOD or VoD) relates to a service wherein a customer places an order for video content (via telephone or using a menu system on their video equipment). That video is then delivered to the user (either in real time or after a suitable delay wherein the video begins streaming and is cached until enough of the video is locally stored to enable the video to hopefully progress without delays once the customer begins viewing). This technology, however, has been found limiting since peak demand times consume too much bandwidth for many service providers to be able to handle reliably.

Another form of VOD utilizes so-called "push" technology wherein selections of full content (deemed by the service provider as likely to be ordered) is sent by the service provider using excess bandwidth to the customer's equipment on the hopes that the customer will at some point while the content is stored wish to order and view the content. Upon ordering the content, it is retrieved and played without further download, which minimizes the problems with conventional VOD. However, this solution can suffer from a need to store large amounts of data at the customer's premises for only a limited number of VOD programs that might potentially be ordered.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 2 is an example data stream of a digital video image consistent with certain embodiments of the present invention.

FIG. 3 is an example data stream of inter-coded pictures for speculative storage in a manner consistent with certain embodiments of the present invention.

FIG. 4 is an example data stream of streaming inter-coded pictures with pseudo-I-frames streamed in a manner consistent with certain embodiments of the present invention.

FIG. 5 is another example data stream of streaming inter-coded pictures streamed in a manner consistent with certain embodiments of the present invention.

FIG. 6 is a flow chart depicting an example process for pushing intra-coded data to a receiver device in a manner consistent with certain embodiments of the present invention.

FIG. 7 is an example flow chart depicting streaming of intra-coded data to a receiver device in a manner consistent with certain embodiments of the present invention.

DETAILED DESCRIPTION

Figure 1:
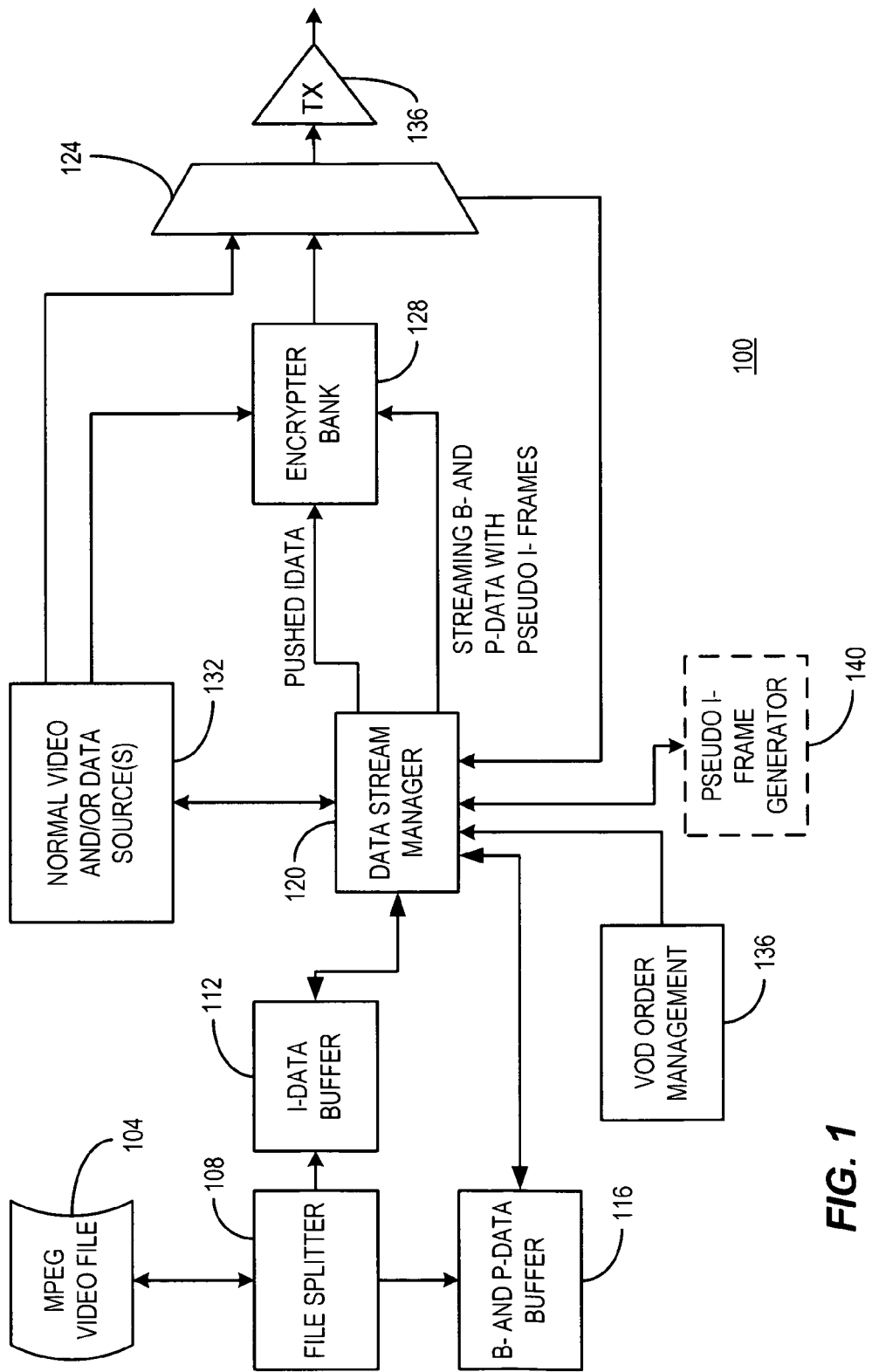
FIG. 1 is a block diagram of an example speculative VOD system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the terms "I-frame", "B-frame", "P-frame". "I-data", "P-data" and "B-data" are used in a manner consistent with their use in connection with MPEG (Moving Pictures Expert Group) video standards to refer to Intra-coded data and Inter-coded data (i.e., predictive coded and/or bi-directional predictive coded data) as used in that context. However, the present invention is not limited to an MPEG context per se since other video compression algorithms utilize similar structures and should not be excluded. The term "pseudo-I-frame" or "PI-frame" and similar terms refers to an I-frame carrying no actual video data, such I-frame being constructed as a low overhead placeholder for which an actual cached I-frame is substituted as will be clear when considering certain of the disclosed embodiments.

The term "Speculative VOD" as used herein relates to a content provider "pushing" content to a PVR/DVR (personal video recorder or digital video recorder) or other suitable storage device at the customer's premises using available bandwidth in the network. The objective is that the customer will want to view the content and it will be more readily available if the content is present locally. This minimizes the amount of data that has to be transmitted on demand. However, only a portion of the content is pushed in accord with embodiments consistent with the present invention and other parts of the content are streamed on demand. This can be particularly advantageous when the available bandwidth is insufficient to sustain a pure streaming link in real time or near real time (such terms being used synonymously and interchangeably herein). Further, the customer's equipment can store a broader range of speculative VOD content than would be possible if the full VOD video content is stored locally, while simultaneously reducing demands on the network introduced by VOD streams. By providing sufficient speculative content, the viewer gets near "instant gratification" by virtue of being able to almost immediately begin viewing the content while streaming of the remaining data in the background provides the remaining missing content and uses less on-demand bandwidth to keep up.

In accord with one implementation, a series of I-frames (inter-coded data) is taken from the Group of Pictures (GOP) structure (typically only about $1/15$ of the video frames are I-frames) as the speculative content. This is a significant portion of the content from the point of view of quantity of data bit-wise, but is essentially un-viewable as is. The remaining P- and B-frames (the intra-coded frames from the GOP structure) make up a much smaller portion of the content in terms of bit-count but the majority of the content based on frame count. These P- and B-frames are needed in combination with the I-frames to view the content and associated audio as intended. By streaming the intra-coded portion in real time, the bandwidth requirements on the link are reduced as compared with conventional VOD and the storage requirements at the customer premises are reduced compared with conventional push VOD.

Additionally by streaming P- and B-frames in real time, the service provider may choose to either encrypt this intra-coded data or not (in full or selectively) based upon the perceived need to provide additional protection to the content. Synchronization between the local content and the network server can be provided by the I-frame time stamps being uplinked from the service provider's local server. The lower bandwidth requirements will enable better trick play (because typical trick play is based upon the anchor frames such as I-frames which are already present and stored locally and can be retrieved for fast forward and fast reverse playback without intervention of the service provider). A synchronous trick play can be implemented on the network server using the time stamps of the existing I-frames such that nominal playback can be initiated near instantaneously.

The real time stream of P- and B-frame data can also include a pseudo I-frame as a synchronizing place holder for the speculatively loaded real I-frames. This pseudo I-frame can be used to provide a simple sequence number that would add a trivial amount of bandwidth load.

Speculative data could be or could include any "critical" data used in selective encryption applications—that is—data that would be encrypted selectively to obscure an entire collection of data. I-frames are one example, since without the I-frame data it is extremely difficult to recover the full video stream. In this context, in certain embodiments, only such "critical" data might be encrypted thereby freeing the encrypter(s) of the burden of encrypting all data. In other implementations, all data could be encrypted, or the encrypted data could include both the speculatively transmitted cached data and the streamed data or parts thereof without limitation.

Turning now to FIG. 1, an example VOD transmission system as would form a part of the service provider (cable, satellite, Internet TV, etc.) head-end is depicted as 100. In this example implementation, it is assumed that a program, movie, etc. is stored at 104 as an MPEG or similar digital video file for distribution as VOD content. The VOD video file 104 is split at file splitter 108 so as to separate (in this example) the I-frame data from the B- and P-frame data. The I-data are placed in an I-data buffer 112 and the P- and B-frame data are placed in the B- and P-frame buffer 116. The use of separate storage locations for 104, 112 and 116 is depicted for ease of illustration, and in fact may be accomplished with a single storage medium or array thereof without limitation. Moreover, the splitting the data can occur dynamically by simply diverting data from a single file as separate streams of data—one for speculative transmission and one for streaming without departing from embodiments consistent with the present invention. Thus, the illustration is for purposes of understanding and is not necessarily intended as a roadmap for exact implementation.

The data stream manager 120 is coupled to the I-data buffer 112 and the B- and P-data buffer 116 and further determines from any suitable analysis or data feed what the state of loading of the network is. This information for example can come from monitoring the data passed to multiplexer 124 to determine if a null packet has been or is to be inserted in the transport stream produced as an output thereof. In the event filler null packets are to be inserted, this creates an opportunity to insert I-data packets that are to be speculatively pushed to the customer's equipment. When the data stream manager 120 determines that bandwidth is available to push speculative data to the customer, the I-data from buffer 112 is inserted instead of null packets or other filler to produce pushed I-data. This data can be fully or selectively encrypted at one or more encrypter devices 128 which then passes the encrypted packets to the multiplexer 124 for combination with normal video or data packets from sources 132 to form one or more transport streams or other output streams that are transmitted by transmitter or other output interface device 136.

Once the speculative data are sent to the customer's equipment for storage, approximately $1/15^{th}$ of the frames of data needed for playback are available for immediate access by the customer (in this example where the speculative data are inter-coded frame data). However, on a bit-wise basis, this data represents a far larger percentage of the data needed for playback in cooperation with the streamed data. While inter-coded frame data and intra-coded frame data are used as dividing points for the example embodiment, the invention is not limited strictly to this dividing point. By use of this dividing point, however, trick play is readily accomplished, but this does not preclude transmission of additional speculative data—encrypted or unencrypted or some combination thereof—as the speculative data with the balance being streamed in either encrypted, unencrypted or some combination thereof.

Upon demand from the customer for the VOD content, the remaining B- and P-frame data can be streamed to the customer's site in either full or selectively encrypted form or in un-encrypted form. Content can be selected for encryption, for example, using any of the techniques or combinations thereof disclosed in U.S. Pat. No. 7,127,619 to Unger, et al. issued Oct. 24, 2006 which is hereby incorporated by reference. FIG. 1 depicts full encryption of this content. An order for the VOD programming is processed by the service provider's order management system 136 which then instructs the data stream manager to direct the B- and P-frame data from buffer 116 to the customer as a stream of video. Accordingly, the data stream manager 120 pulls B- and P-frame data from the buffer 116 to produce a stream of B- and P-data through encrypter 128 whose output is multiplexed at 124 for distribution to the customer.

In certain implementations, as briefly noted above, the B- and P-data can be multiplexed with a pseudo I-frame (PI-frame) generated at pseudo-I-frame generator 140 so as to create a stream in which the receiver can simply substitute like numbered cached I-frames to reconstruct the original video file. In yet another embodiment, the PI-frame data can be stored in buffer 116 so that it is simply retrieved and streamed with minimal processing at the time the VOD content is to be delivered to the customer.

At the customer premises, the I-frames are stored in local storage (e.g., a disc drive, solid state drive (SSD), or any other suitable non-volatile storage medium) forming part of a DVR) and are available for combination with the streamed B- and P-frame data. In the case of use of the PI-frame data, I-frames cached at the customer site are simply substituted for the PI-frame data to replicate the original stream representing the video data.

The original data file for the video can be represented as shown in FIG. 2 as a stream 160 of I-frames interspersed (depending upon content) with B-frames and P-frames. The speculatively cached I-frame data is sent as shown in FIG. 3 as bandwidth is available as shown as 170. Upon receipt of a valid order from the customer, a stream such as 180 or 190 is streamed in real time as shown in FIG. 4 and FIG. 5. In FIG. 4, stream 180 is similar to stream 160 with pseudo-I-frame data inserted in place of the actual I-frames. In the example of FIG. 5, the stream includes no I frames and additional data are used to reconstruct the stream to its original form 160. In one embodiment, timing for insertion of the I-frames is separately transmitted, while in other embodiments, the packet counters are retained in the speculatively transmitted I-frame data and are used in the reconstruction. Synchronization between the local content and the network server can also be provided by the I-frame time stamps being uplinked from the service provider's local server for use by the receiver device to properly time the playback of intra-coded and inter-coded frames. Either actual keys or permission certificates, in the case of stored embedded keys, would also be sent from the service provider's system.

In one implementation, the flow chart 200 of FIG. 6 depicts the process of pushing I-frame data from the service provider to the customer equipment starting at 204. In this example, if the data stream manager 120 determines at 208 that a null packet is to be inserted into the data stream at multiplexer 124 (or has been inserted, or otherwise determines that there is available bandwidth) then the next available I-frame data are pulled from the I-frame buffer 112 at 212. If not already packetized, this I-frame data are then passed to the multiplexer for transmission at 216 (generally after being encrypted at encrypter 128). If this is not the last I-frame at 220, control passes back to 208 to await the next available slot of bandwidth for transmission of the next packet of speculative I-frame data. When the last I-frame of the current content is reached at 220 and has been processed, the process ends at 224.

An example process 240 for streaming B- and P-data is depicted in FIG. 7 starting at 244. At 248, the process awaits receipt of a VOD order for the VOD content. When an order is received at 248 as indicated by the VOD order management system 136, the data stream manager 120 begins pulling B- and P-frame data from buffer 116 at 252 and, in the event PI-frames are used, combining the B- and P-frame data with PI-frame data created at 140 at 256 to produce a stream that is sent to multiplexer 124 for transmission at 260. This process repeats by pulling the next B- or P-frame from the buffer 116 at 252 and processing at 256 and 260 until the last frame has been processed at 264, at which point the process ends at 268 for this on demand program. Block 256 is shown in broken lines as an indication that the block is optional depending upon whether PI-frame data are used.

Figure 8:
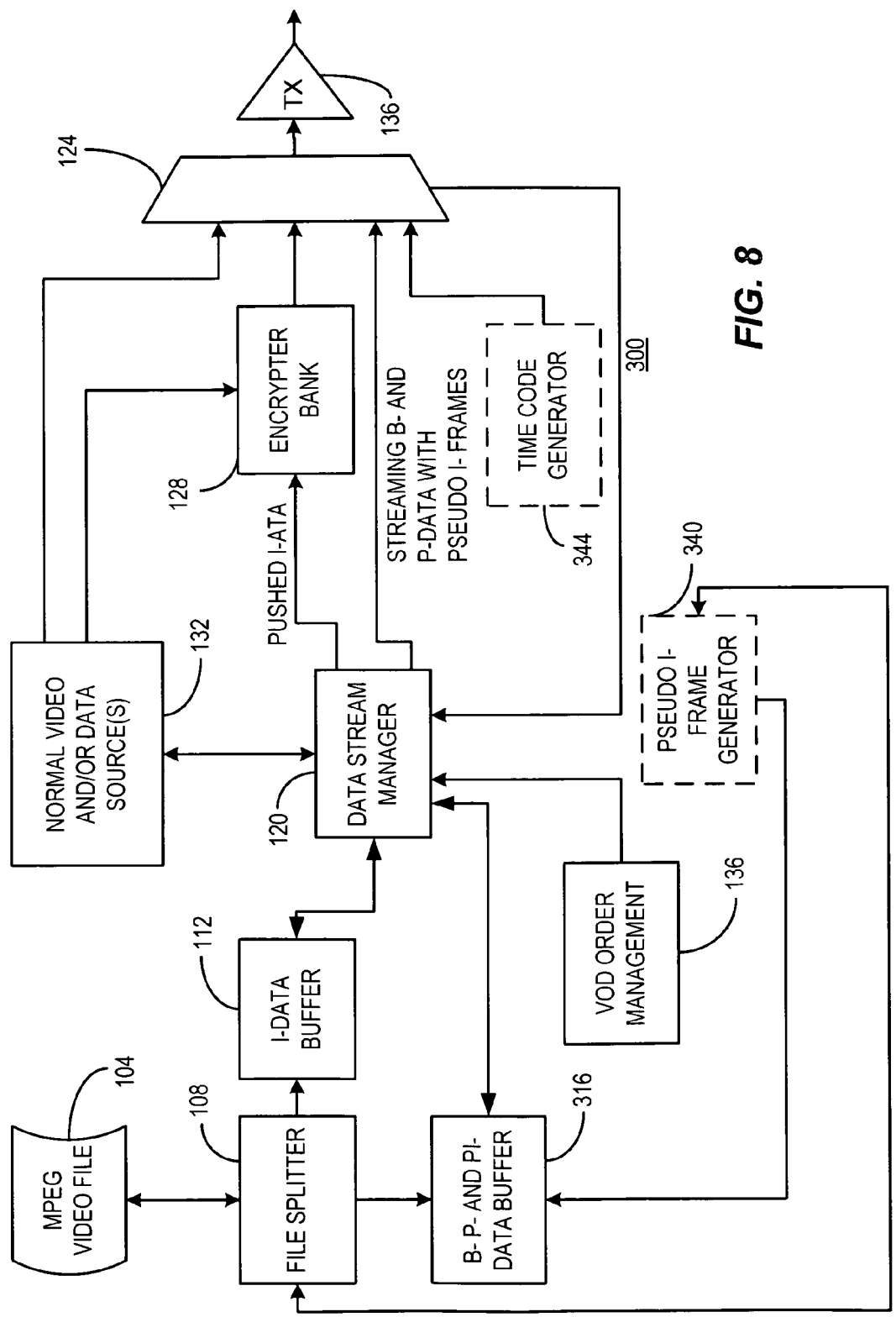
FIG. 8 is a block diagram of an example speculative VOD system consistent with certain embodiments of the present invention.

FIG. 8 depicts another embodiment 300 with several minor variations depicted that can be made individually or collectively in accord with certain implementations. In this implementation, the system functions similarly to that of system 100, except that the B- and P-data buffer 316 also stores PI-frame data so that the full stream of data can be simply retrieved and transmitted if PI-frames are used. In this example, the PI-frame data are generated at the time of buffering the B- and P-frame data at the file splitter 108. Additionally, the data stream manager in this implementation passes the stream of B- and P-frame data (and optionally PI-frame data) directly to the multiplexer 124 for transmission. Since the B- and P-data are not generally useful without the anchor data supplied in I-frames, in many instances there is little added security benefit in encryption of the B- and P-frame data. Accordingly, in this implementation, the encryption burden borne by the encrypters 128 is lessened potentially improving throughput and reducing need for additional encrypters in the encrypter bank 128. Time codes can be generated at time code (time stamp) generator 344 for use by the receiver in reconstructing the VOD program so as to identify times for the insertion of the I-frame data back into the data stream in certain implementations.

Figure 9:
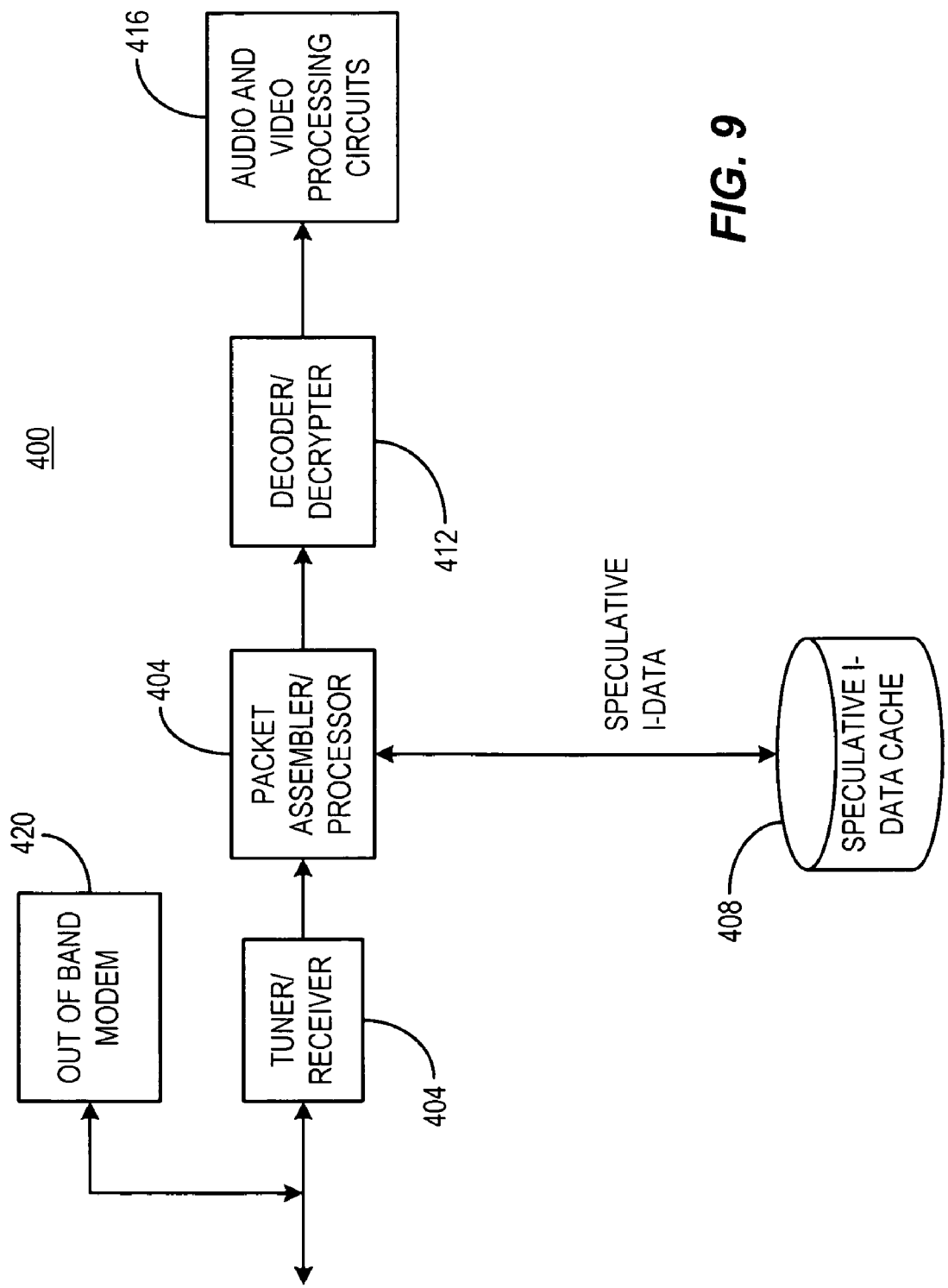
FIG. 9 is an example VOD receiver device such as a television set or set top box or the like consistent with certain embodiments of the present invention.

FIG. 9 depicts an example receiver system for the VOD processes described thus far shown generally as 400. In this system, data packets are received via tuner/receiver 404 (in the case of conventional cable, broadcast or satellite television, or via a network interface for Internet TV). The receiver outputs packets to a packet processor 404 which, in the case of the speculative I-data routes the data packets to storage 408 to form a speculative I-data cache. When a VOD program is ordered, the received data stream will include B- and P-data packets and the processor 404 acts as a stream re-assembler by retrieving the appropriate I-data from cache 408 and appropriately combining the I-data with the B- and P-data being streamed from the headend to produce a properly ordered sequence of video frames when decoded. Where PI-data packets are embedded in this stream, the I-data packets are swapped for the PI-data packets in the stream, otherwise, a time base or packet sequence is used to determine placement of the packets. This results in a reconstructed stream resembling that of FIG. 2. This reconstructed stream is passed to decoder and decrypter circuits 412 for further processing to produce audio and video data that are processed by audio and video processing circuits at 416. Out-of-band communication and signaling (which may include sending an order to the service provider for VOD programming) is carried out using an out-of-band modem 420 in the case of conventional digital television systems. This processing can all take place in any number of physical devices including set top terminals (set top boxes), television sets, satellite receiver boxes, set back boxes, Internet TV converters or network interfaces, etc. without limitation.

Figure 10:
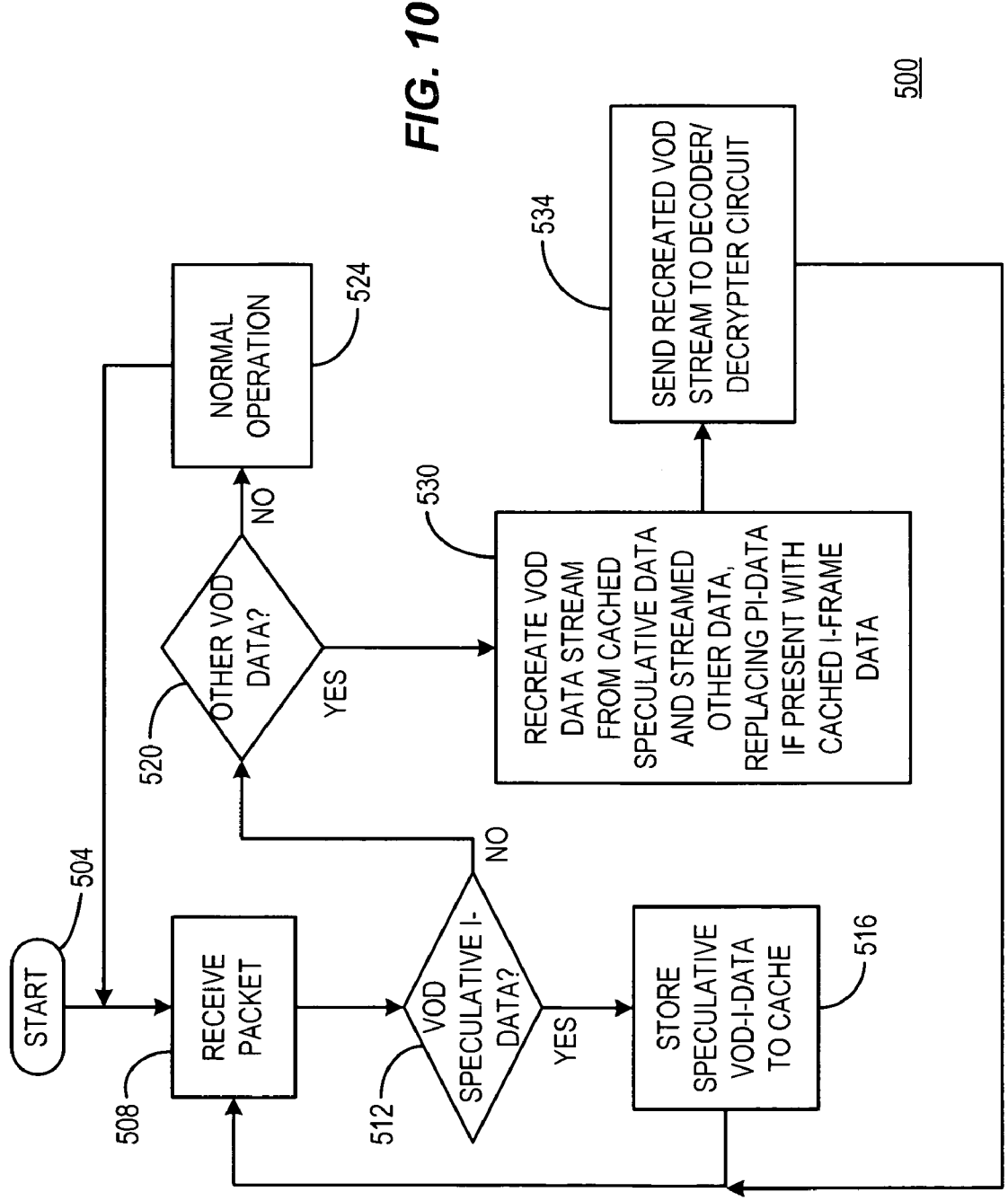
FIG. 10 is an example flow chart depicting an example mode of operation of the device of FIG. 9 in a manner consistent with certain embodiments of the present invention.

An example receiver end process 500 is depicted in FIG. 10 starting at 504. When a video data packet is received at 508, a determination is made as to whether it is a VOD speculative I-data packet or not at 512. This can be determined by any number of means, including but not limited to, an indicator in private, ancillary or adaptation data or by data received out of band. If the data are in fact speculative VOD I-frame data, then it is stored to the storage device (e.g., a DVR) at 516 and control returns to 508 to await the next data packet. If the data at 512 is not speculative VOD I-frame data, control passes to 520 where it is determined if the data are other VOD data. If not, the packet is handled in a suitable manner for the particular packet type at 524 and control again returns to 508. However, if the packet is other VOD data (e.g., VOD B-, P- or PI-data) it is passed to process 530 where it is used to recreate the VOD data stream by combining the B- and P-data with the cached I-data. In the case where PI-data are used, the PI-data are discarded and the I-data are substituted therefor. In other implementations, time stamps or time codes from a network server can be used to indicate the location for placement of the I-frame packets in the stream. There are 2 types of MPEG time stamps: Presentation Time Stamp (PTS) which tells the system when to display a frame and Decode Time Stamp (DTS) that tells the system when to decode a frame. The audio stream uses the PTS (as decode time is essentially instantaneous), and when audio PTS is matched to video PTS, lipsync is achieved (if the content was encoded properly). These time stamps can be used to re-assemble the video stream in most cases. However, if they prove insufficient, an additional simple time stamp can be added. This reconstituted program stream is then sent at 534 to the decoder and decrypter circuit 412 for processing.

It should be noted that although the examples shown provide for push of I-frame data in a speculative manner and streaming of B- and P-frame data on receipt of a Video on Demand order, other mechanisms can be used to divide the data into separate segments. For example, the data can simply be divided on the basis of data volume such that some designated target percentage of the data is pushed and the remainder streamed. In other implementations, the amount of data sent speculatively can vary as a function of available average storage at the customer site or on the basis of average available bandwidth, amount of demand for a particular VOD program or any other criteria. Encryption can be full or selective as desired for the level of security of the content required or desired. In a preferred implementation the speculative I-frames would be encrypted since they can stand alone. The P and B frames are generally of little use without the anchor I-frames as a reference, but one can optionally encrypt any or all of the P and B frames too. In any case, decryption of the appropriate packets will need to be accounted for by use of stored or transferred keys or key seeds, which may be provided in an advance or speculative basis or other suitable basis.

Thus, in certain implementations, a method of transmitting a Video-on-Demand (VOD) program involves at a service provider head-end, separating VOD program data into first and second parts; transmitting the first part over a communication network to a recipient receiver for storage at a storage device as cached speculative data, where the transmitting is carried out as a data push when the communication network has available bandwidth to permit such transmitting and without regard for any order having been received for the VOD program to be sent to the receiver; receiving an order for the VOD program to be sent to the receiver; and streaming the second part to the receiver for reassembly into the VOD program at the receiver by combining the second part as it is streamed with the cached speculative data.

In certain implementations, the first part comprises inter-coded video data and the second part comprises intra-coded video data. In certain implementations, the VOD program is MPEG coded and where the first part comprises inter-coded video data and the second part comprises intra-coded video data. In certain implementations, the inter-coded video data comprises I-frame data and where the intra-coded data comprises B- and P-frame data. In certain implementations, the second part further comprises pseudo-I-frame data serving as a place holder for the I-frame data of the first part. In certain implementations, the pseudo-I-frame data contains a sequence number for use by the receiver for combining the first part with the second part. In certain implementations, the second part is streamed as a result of receipt of an order for the VOD program. In certain implementations, the method further involves transmitting time codes to the receiver, where said time codes determine sequencing for combining the first part with the second part at the receiver. In certain implementations, the method further involves encrypting at least a portion of the first part. In certain implementations, the method further involves encrypting at least a portion of the second part.

A tangible computer readable storage medium can store instructions which, when executed on one or more programmed processors, carry out any of the methods disclosed herein.

Another method consistent with certain embodiments of transmitting an MPEG coded Video-on-Demand (VOD) program involves at a service provider head-end, separating VOD program data into first and second parts, where the first part comprises inter-coded I-frame video data and where the second part comprises intra-coded B- and P-frame data; transmitting the first part over a communication network to a recipient receiver for storage at a storage device as cached speculative data, where the transmitting is carried out as a data push when the communication network has available bandwidth to permit such transmitting and without regard for any order having been received for the VOD program to be sent to the receiver; receiving an order for the VOD program to be sent to the receiver; and responsive to a received order for the VOD program, streaming the second part to the receiver for reassembly into the VOD program at the receiver by combining the second part as it is streamed with the cached speculative data.

In certain implementations, the second part further comprises pseudo-I-frame data serving as a place holder for the I-frame data of the first part. In certain implementations, the pseudo-I-frame data contains a sequence number for use by the receiver for combining the first part with the second part. In certain implementations, the method further involves transmitting time codes to the receiver, where said time codes determine sequencing for combining the first part with the second part at the receiver. In certain implementations, the method further involves encrypting at least a portion of the first part. In certain implementations, the method further involves encrypting at least a portion of the second part.

Another method of processing a Video-on-Demand (VOD) program at a receiver device involves receiving at the receiver device a first part of the VOD program over a communication network; storing the first part at a storage device as cached speculative data, where the first part is pushed from a service provider to the receiver device when the communication network has available bandwidth to permit such transmitting and without regard for any order having been received at the service provider for the VOD program to be sent to the receiver device; sending an order to the service provider for the VOD program to be sent to the receiver device; and receiving a stream of data containing a second part of the VOD program, wherein the receiver device assembles the streamed second part of the VOD program with the cached speculative data to recreate the VOD program.

In certain implementations, the first part comprises inter-coded video data and the second part comprises intra-coded video data. In certain implementations, the VOD program is MPEG coded and where the first part comprises inter-coded video data and the second part comprises intra-coded video data. In certain implementations, the inter-coded video data comprises I-frame data and where the intra-coded data comprises B- and P-frame data. In certain implementations, the second part further comprises pseudo-I-frame data serving as a place holder for the I-frame data of the first part. In certain implementations, the pseudo-I-frame data contains a sequence number for use by the receiver for combining the first part with the second part. In certain implementations, the method further involves receiving time codes from the service provider at the receiver, where said time codes determine sequencing for combining the first part with the second part at the receiver. In certain implementations, at least a portion of the first part is encrypted and further comprising decrypting the encrypted portion of the first part. In certain implementations, at least a portion of the second part is encrypted and further comprising decrypting the encrypted portion of the first part.

Another method of processing a Video-on-Demand (VOD) program at a receiver device involves receiving at the receiver device a first part of the VOD program over a communication network; storing the first part at a storage device as cached speculative data, where the first part is pushed from a service provider to the receiver device when the communication network has available bandwidth to permit such transmitting and without regard for any order having been received at the service provider for the VOD program to be sent to the receiver device; sending an order to the service provider for the VOD program to be sent to the receiver device; receiving a stream of data containing a second part of the VOD program, wherein the receiver device assembles the streamed second part of the VOD program with the cached speculative data to recreate the VOD program; where the VOD program is MPEG coded and where the first part comprises inter-coded I-frame video data and the second part comprises intra-coded B- and P-frame video data.

In certain implementations, the second part further comprises pseudo-I-frame data serving as a place holder for the I-frame data of the first part. In certain implementations, the pseudo-I-frame data contains a sequence number for use by the receiver for combining the first part with the second part. In certain implementations, the method further involves receiving time codes from the service provider at the receiver, where said time codes determine sequencing for combining the first part with the second part at the receiver. In certain implementations, at least a portion of the first part is encrypted and further comprising decrypting the encrypted portion of the first part. In certain implementations, at least a portion of the second part is encrypted and further comprising decrypting the encrypted portion of the first part.

A Video-on-Demand (VOD) program transmission system according to certain implementations has a file splitter device that separates VOD program data into first and second parts. A data stream manager forwards the first part to a multiplexer for transmission over a communication network to a recipient receiver for storage at a storage device as cached speculative data, where the transmitting is carried out as a data push when the communication network has available bandwidth to permit such transmitting and without regard for any order having been received for the VOD program to be sent to the receiver. A VOD order processor receives an order for the VOD program to be sent to the receiver. The data stream manager streaming the second part to the receiver via the multiplexer for reassembly into the VOD program at the receiver by combining the second part as it is streamed with the cached speculative data.

In certain implementations, the first part comprises inter-coded video data and the second part comprises intra-coded video data. In certain implementations, the VOD program is MPEG coded and the first part comprises inter-coded video data and the second part comprises intra-coded video data. In certain implementations, the inter-coded video data comprises I-frame data and the intra-coded data comprises B- and P-frame data. In certain implementations, a pseudo-I-frame generator is provided, and the second part further comprises pseudo-I-frame data serving as a place holder for the I-frame data of the first part. In certain implementations, the pseudo-I-frame data contains a sequence number for use by the receiver for combining the first part with the second part. In certain implementations, the second part is streamed as a result of receipt of an order for the VOD program. In certain implementations, a time code generator generates time codes that are transmitted to the receiver, where the time codes determine sequencing for combining the first part with the second part at the receiver. In certain implementations, an encrypter encrypts at least a portion of the first part or the second part.

In another implementation, a Video-on-Demand (VOD) program receiver device has a receiver receiving a first part of the VOD program over a communication network. A storage device stores the first part as cached speculative data, where the first part is pushed from a service provider to the receiver device when the communication network has available bandwidth to permit such transmitting and without regard for any order having been received at the service provider for the VOD program to be sent to the receiver device. Upon a sending an order to the service provider for the VOD program to be sent to the receiver device, the receiver receives a stream of data containing a second part of the VOD program, wherein the receiver device assembles the streamed second part of the VOD program with the cached speculative data to recreate the VOD program.

In certain implementations, the first part comprises inter-coded video data and the second part comprises intra-coded video data. In certain implementations, the VOD program is MPEG coded and the first part comprises inter-coded video data and the second part comprises intra-coded video data. In certain implementations, the inter-coded video data comprises I-frame data and the intra-coded data comprises B- and P-frame data. In certain implementations, the second part further comprises pseudo-I-frame data serving as a place holder for the I-frame data of the first part. In certain implementations, the pseudo-I-frame data contains a sequence number for use by the receiver device for combining the first part with the second part. In certain implementations, the receiver further receives time codes from the service provider at the receiver, where the time codes determine sequencing for combining the first part with the second part at the receiver. In certain implementations, at least a portion of the first part or second part is encrypted and further comprising a decrypter that decrypts the encrypted portion.

Those skilled in the art will recognize, upon consideration of the above teachings, that certain of the above exemplary embodiments are based upon use of a programmed processor, for example for implementation of data stream manager 120. Other elements are most commonly implemented in dedicated hardware (e.g., buffers, encrypters, decoders, etc.) However, the invention is not limited to such exemplary embodiments, since other embodiments could be implemented using hardware component equivalents for the programmed processors such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in hardware state machines or other implementations without departing from embodiments of the present invention. In certain cases, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of transmitting a Video-on-Demand (VOD) program, comprising:
    at a service provider head-end, separating numbered frames of VOD program data into first and second parts;
    where the first part comprises inter-coded video frame data and the second part comprises intra-coded video frame data having pseudo-inter-coded frames inserted in place of the inter-coded frame data and where the numbered frames of inter-coded data are replaced with pseudo-inter-coded frames having identical frame numbers so that the pseudo-inter-coded frames serve as place holders;
    transmitting the first part over a communication network to a recipient receiver for storage at a storage device as cached speculative data, where the transmitting is carried out as a data push when the communication network has available bandwidth to permit such transmitting and without regard for any order having been received from the recipient receiver for the VOD program to be sent to the receiver;
    receiving an order for the VOD program to be sent to the receiver; and
    streaming the second part to the receiver for reassembly into the VOD program at the receiver by combining the second part as it is streamed with the cached speculative data, and where the second part is interleaved with the first part with the inter-coded frames substituting for pseudo-inter-coded frames having identical frame numbers to reconstruct the numbered frames of VOD program data.

2. The method according to claim 1, where the VOD program is MPEG coded and where the first part comprises inter-coded video data and the second part comprises intra-coded video data.

3. The method according to claim 2, where the inter-coded video data comprises I-frame data and where the intra-coded data comprises B- and P-frame data.

4. The method according to claim 3, where pseudo-inter-coded frames comprise pseudo-I-frame data serving as a place holder for the I-frame data of the first part.

5. The method according to claim 4, where the pseudo-I-frame data contains a sequence number for use by the receiver for combining the first part with the second part.

6. The method according to claim 1, where the second part is streamed as a result of receipt of an order from the recipient receiver for the VOD program.

7. The method according to claim 1, further comprising encrypting at least a portion of the first part.

8. The method according to claim 1, further comprising encrypting at least a portion of the second part.

9. A non-transitory computer readable storage medium storing instructions which, when executed on one or more programmed processors, carry out a method according to claim 1.

10. A method of processing a Video-on-Demand (VOD) program at a receiver device, comprising:
    receiving at the receiver device a first part of the VOD program over a communication network, where the first part comprises inter-coded video frame data;
    storing the first part at a storage device as cached speculative data, where the first part is pushed from a service provider to the receiver device when the communication network has available bandwidth to permit such transmitting and without regard for any order having been received from the receiver device at the service provider for the VOD program to be sent to the receiver device;
    sending an order to the service provider for the VOD program to be sent to the receiver device; and
    receiving a stream of data containing a second part of the VOD program, wherein the second part contains numbered frames of inter-coded data;
    where the second part comprises intra-coded video frame data having pseudo-inter-coded frames inserted in place of the inter-coded frame data, where the numbered frames of inter-coded data are replaced with pseudointer-coded frames having identical frame numbers so that the pseudo-inter-coded frames serve as place holders;

wherein the receiver device assembles the streamed second part of the VOD program with the cached speculative data to recreate the VOD program; and where the second part is interleaved with the first part with the inter-coded frames substituting for pseudo-inter-coded frames having identical frame numbers to reconstruct the numbered frames of VOD program data.

11. The method according to claim 10, where the inter-coded video data comprises I-frame data and where the intra-coded data comprises B- and P-frame data.

12. The method according to claim 11, where the pseudo-inter-coded frames comprises pseudo-I-frame data serving as a place holder for the I-frame data of the first part.

13. The method according to claim 12, where the pseudo-I-frame data contains a sequence number for use by the receiver for combining the first part with the second part.

14. The method according to claim 10, where at least a portion of the first part is encrypted and further comprising decrypting the encrypted portion of the first part.

15. The method according to claim 10, where at least a portion of the second part is encrypted and further comprising decrypting the encrypted portion of the first part.

16. A non-transitory computer readable storage medium storing instructions which, when executed on one or more programmed processors, carry out a method according to claim 10.

17. A Video-on-Demand (VOD) program transmission system, comprising:

a file splitter device that separates numbered frames of VOD program data into first and second parts;

where the first part comprises inter-coded video frame data and the second part comprises intra-coded video frame data having pseudo-inter-coded frames inserted in place of the inter-coded frame data, and where the numbered frames of inter-coded data are replaced with pseudo-inter-coded frames having identical frame numbers so that the pseudo-inter-coded frames serve as place holders;

a data stream manager that forwards the first part to a multiplexer for transmission over a communication network to a recipient receiver for storage at a storage device as cached speculative data, where the transmitting is carried out as a data push when the communication network has available bandwidth to permit such transmitting and without regard for any order having been received from the recipient receiver for the VOD program to be sent to the receiver;

a VOD order processor that receives an order for the VOD program to be sent to the receiver; and the data stream manager streaming the second part to the receiver via the multiplexer for reassembly into the VOD program at the receiver by combining the second part as it is streamed with the cached speculative data, and where the second part is interleaved with the first part with the inter-coded frames substituting for pseudo-inter-coded frames having identical frame numbers to reconstruct the numbered frames of VOD program data.

18. The transmission system according to claim 17, where the VOD program is MPEG coded.

19. The transmission system according to claim 18, where the inter-coded video data comprises I-frame data and where the intra-coded data comprises B- and P-frame data.

20. The transmission system according to claim 19, further comprising a pseudo-I-frame generator, and where the pseudo-intercoded-frame data comprises pseudo-I-frame data serving as a place holder for the I-frame data of the first part.

21. The transmission system according to claim 20, where the pseudo-I-frame data contains a sequence number for use by the receiver for combining the first part with the second part.

22. The transmission system according to claim 17, where the second part is streamed as a result of receipt of an order for the VOD program.

23. The transmission system according to claim 17, further comprising an encrypter that encrypts at least a portion of the first part or the second part.

24. A Video-on-Demand (VOD) program receiver device, comprising:

a receiver receiving a first part of the VOD program over a communication network, where the first part comprises inter-coded video frame data;

a storage device storing the first part as cached speculative data, where the first part is pushed from a service provider to the receiver device when the communication network has available bandwidth to permit such transmitting and without regard for any order having been received from the receiver device at the service provider for the VOD program to be sent to the receiver device;

upon sending an order to the service provider for the VOD program to be sent to the receiver device, the receiver receives a stream of data containing a second part of the VOD program, wherein the receiver device assembles the streamed second part of the VOD program with the cached speculative data to recreate the VOD program;

where the second part comprises intra-coded video frame data having pseudo-inter-coded frames inserted in place of the inter-coded frame data; and where the first part and the second part comprise numbered frames of VOD program data the assembling comprising interleaving the second part with the first part, with the inter-coded frames substituting for pseudo-inter-coded frames having identical frame numbers to reconstruct the numbered frames of VOD program data.

25. The receiver device according to claim 24, where the inter-coded video data comprises I-frame data and where the intra-coded data comprises B- and P-frame data.

26. The receiver device according to claim 25, where the second part further comprises pseudo-I-frame data serving as a place holder for the I-frame data of the first part.

27. The receiver device according to claim 26, where the pseudo-I-frame data contains a sequence number for use by the receiver device for combining the first part with the second part.

28. The receiver device according to claim 24, where at least a portion of the first part or second part is encrypted and further comprising a decrypter that decrypts the encrypted portion.

* * * * *